(12) United States Patent
McGovern (10) Patent No.: US 6,643,585 B2
(45) Date of Patent: Nov. 4, 2003

(54) ROAD NAME DISPLAYING METHOD AND NAVIGATION DEVICE

(75) Inventor: John McGovern, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/225,473

(22) Filed: Aug. 21, 2002

(65) Prior Publication Data

US 2003/0050756 A1 Mar. 13, 2003

(30) Foreign Application Priority Data

Sep. 6, 2001 (JP) .......................... 2001-269918

(51) Int. Cl.[7] .................... G01C 21/00; G01S 13/00
(52) U.S. Cl. .................. 701/211; 701/210; 701/212; 701/213; 340/990; 340/993; 340/995.1; 345/169; 345/530
(58) Field of Search ............... 201/211, 209, 201/210, 207, 208, 117, 200, 212, 213–215; 340/990, 993, 99, 998, 988, 984; 345/123, 125, 121, 122, 765, 854, 169, 530

(56) References Cited

U.S. PATENT DOCUMENTS 5,559,938 A    9/1996  Van Roekel et al. ........ 395/141

*Primary Examiner*—Thomas G. Black
*Assistant Examiner*—Tuan C To
(74) *Attorney, Agent, or Firm*—Brinks Hofer Gilson & Lione (57) ABSTRACT

A road displaying method in a navigation device permits the normal and convenient display of a road name to the user, even though the next road to be traveled or approached is unnamed. In a navigation device operable to guide a vehicle in accordance with a searched guidance route and to display a road name of a next road to be traveled, in a case where the next road to be traveled is not named, a first available road having a road name is determined from the roads included in the guidance route beyond the next road, and the road name of the determined road is displayed.

12 Claims, 8 Drawing Sheets

| NODE | LONGITUDE, LATITUDE | ROAD NAME | ROAD TYPES | INTERSECTION FLAG | ARROW TYPES |
|---|---|---|---|---|---|
| STARTING POINT (NODE $N_0$) | | | | | |
| NODE $N_1$ | | | | | |
| NODE $N_2$ | | | | | |
| ...... | | ...... | ...... | ...... | ...... |
| DESTINATION (NODE $N_e$) | | | | | |

· HIGHWAY
· RAMP
· GENERAL ROAD

ROAD NAME DISPLAYING METHOD AND NAVIGATION DEVICE

BACKGROUND OF THE INVENTION

1. Field of the Invention

The present invention relates to a road name displaying method and a navigation device. More particularly, the present invention relates to a method for displaying a road name in a navigation device operable to guide a vehicle according to a searched guidance route and to display the road name of a next road to be traveled, and to the navigation device.

2. Description of the Related Art

Generally, there are two types of navigation device, namely, a map-guidance type and an arrow-guidance type. The map-guidance type navigation device is designed to draw a map and a guidance route on a display screen, while superimposing a vehicle position mark indicating a present vehicle position at a predetermined position on the map. This navigation device displays the vehicle position mark such that it is relatively moved along the guidance route on the display screen, in accordance with the movement of the vehicle.

Figure 7:
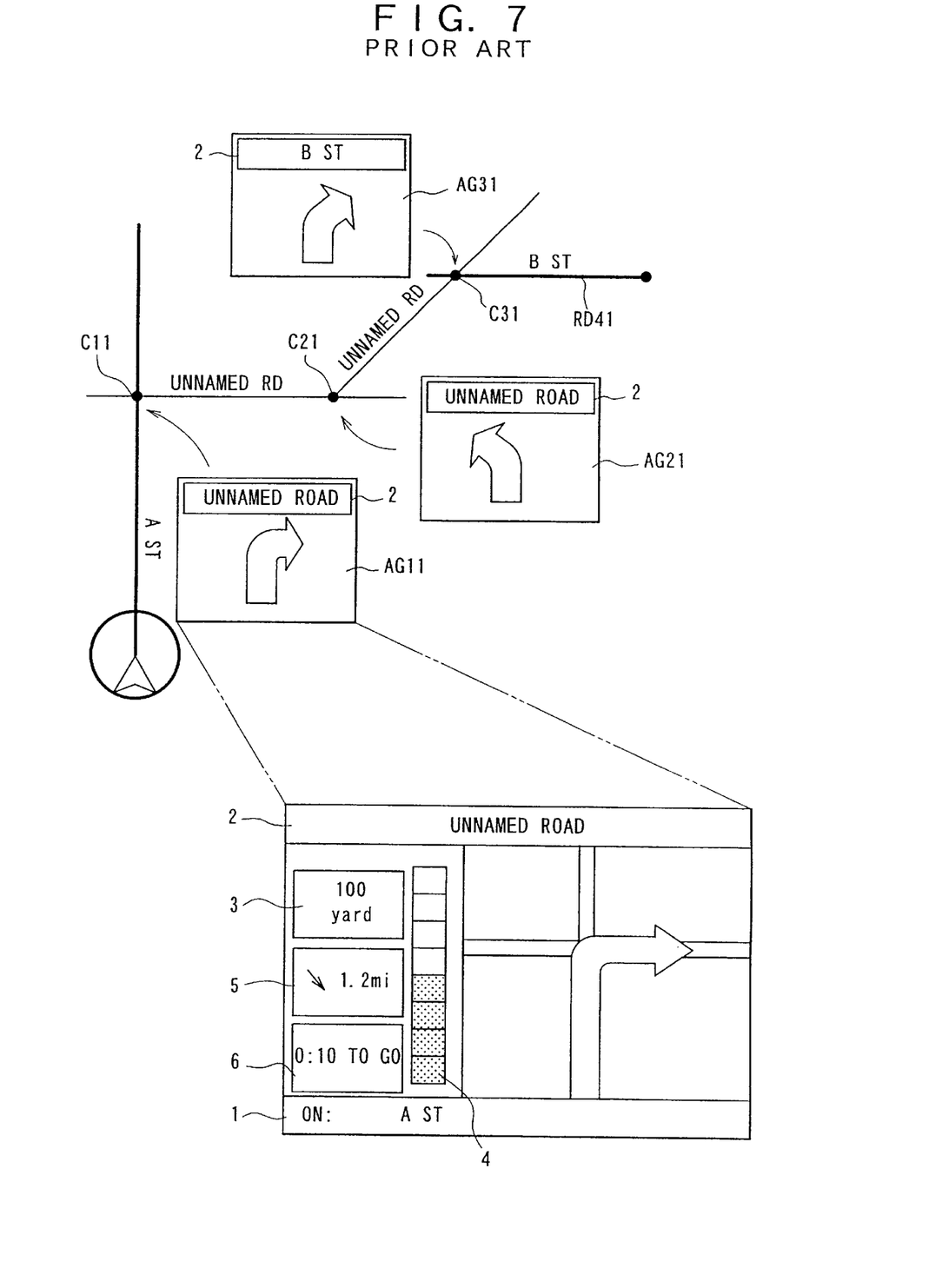
FIG. 7 illustrates an exemplary display by a conventional arrow-guidance type navigation device.

On the other hand, the arrow-guidance type navigation device, as shown in FIG. 7, is designed to draw a guidance route and roads crossing the guidance route in a very simple way, and to designate a guidance traveling direction for the vehicle at each intersection by an arrow mark. Further, this navigation device displays on respective display parts 1 to 6, the following information: (1) the name of a road on which the vehicle is traveling; (2) the name of a next road to be traveled beyond a next intersection; (3) a distance to the intersection; (4) a graph illustrating the remaining distance to the intersection; (5) a direction from the present vehicle position to a destination, and a distance to the destination; and (6) an expected time of arrival at the destination. Also, it may guide the recommended traveling direction of the vehicle at the intersection by voice.

In the conventional arrow-guidance type navigation device, when the next road to be traveled beyond the next intersection is not geographically named, on the display part 2 is displayed a message "UNNAMED ROAD" as an approaching road name. The example of FIG. 7 illustrates that in a case where the next road to be traveled beyond the intersection C11 or C21 has not been named, the message "UNNAMED ROAD" is displayed as the approaching road name on an arrow-guidance-screen AG11 or AG21 regarding the intersection C11 or C21. In a case where the next road to be traveled beyond the intersection C31 is geographically named "B ST(Street)", the message "B ST" is displayed on an arrow-guidance-screen AG 31 as shown in FIG. 7.

Figure 8:
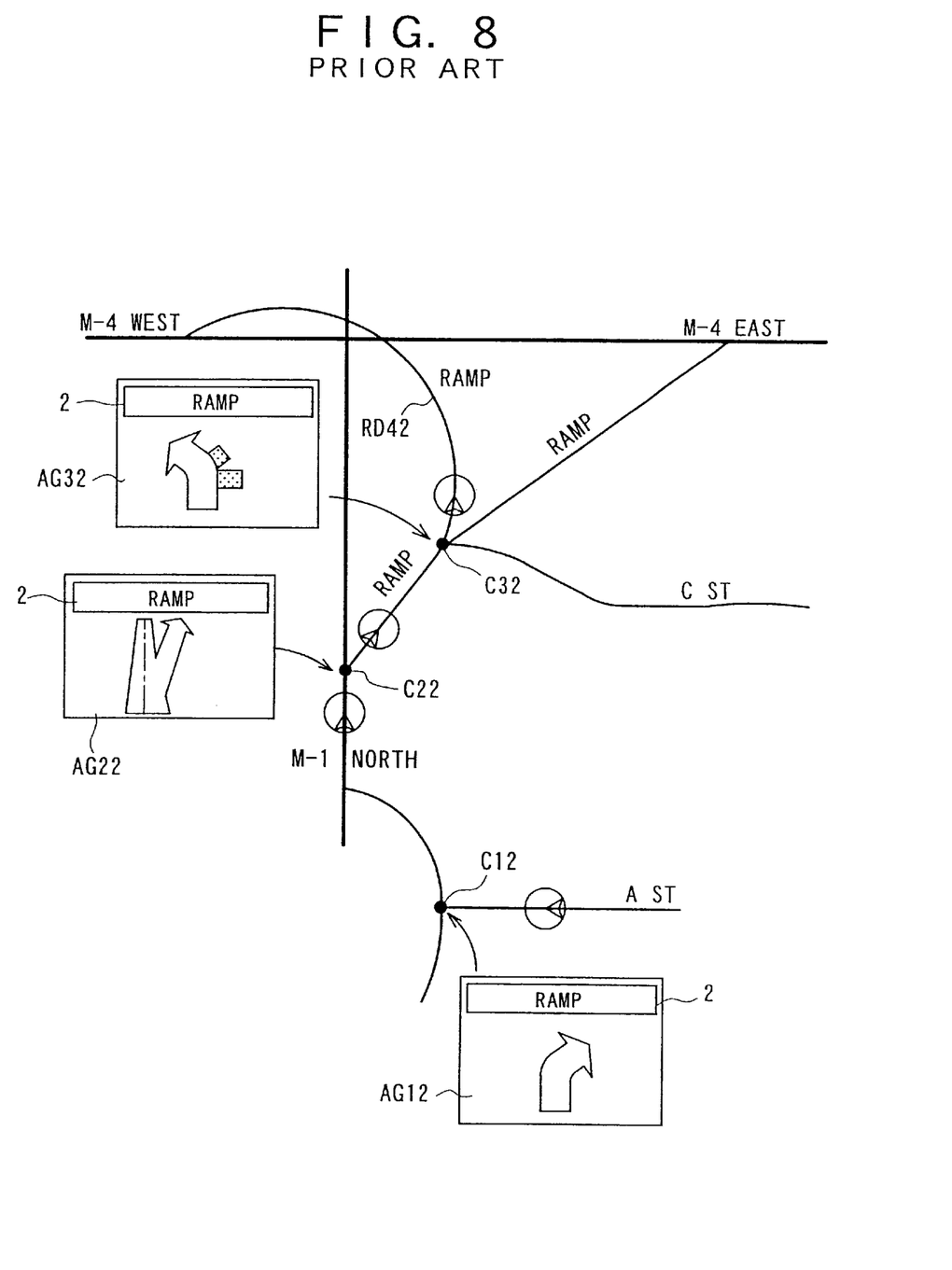
FIG. 8 illustrates another exemplary display by the conventional arrow-guidance type navigation device in a case where a next road to be traveled is a ramp.

Moreover, as illustrated in FIG. 8, the conventional arrow-guidance type navigation device displays a message "RAMP" as the approaching road name on the display part 2, if the next road to be approached is a ramp. Thus, in FIG. 8, after following the driving direction at each of the intersections C12 (an entrance to a highway), C22, and C32, the vehicle enters the corresponding ramp, resulting in the disadvantage that the message "RAMP" is constantly displayed as the approaching road name on each of the arrow-guidance-screens AG12, AG22, and AG32 for the intersections C12, C22, and C32.

As described above, even though the road to be traveled beyond the intersection is unnamed, the display of only the message "UNNAMED ROAD" is inconvenient to a user. Also, even if the road to be approached is the ramp, the display of only the message "RAMP" is similarly inconvenient to the user.

SUMMARY OF THE INVENTION

The present invention has been accomplished in view of the above-mentioned technical background, and it is an object of the present invention to provide a road name displaying method that permits the normal and convenient display of the road name to the user, even though the next road to be traveled or approached is unnamed, and to provide a navigation device using the road name displaying method.

It is another object of the present invention to provide a road name displaying method that permits the normal and convenient display of the road name to the user, even though the next road to be traveled or approached is a ramp, and to provide a navigation device using the road name displaying method.

To solve the foregoing problems, according to a first aspect of the present invention, there is provided a navigation device operable to guide a vehicle in compliance with a searched guidance route and to display the road name of a next road to be traveled, wherein, in a case where the next road to be traveled is not named, the navigation device determines a first available road having a road name from the roads included in the guidance route beyond the next road, and displays the road name of the determined road. This permits the normal and convenient display of the road name to the user, even though the next road to be traveled is unnamed.

According to a second aspect of the present invention, there is provided a navigation device operable to guide a vehicle in compliance with a searched guidance route and to display the road name of a next road to be traveled, wherein, in a case where the next road to be traveled is a ramp, the navigation device determines a road past the ramp that is connected to the ramp and included in the guidance route, and displays the road name of the determined road. This permits the normal and convenient display of the road name to the user, even though the next road to be traveled is a ramp.

Figure 1:
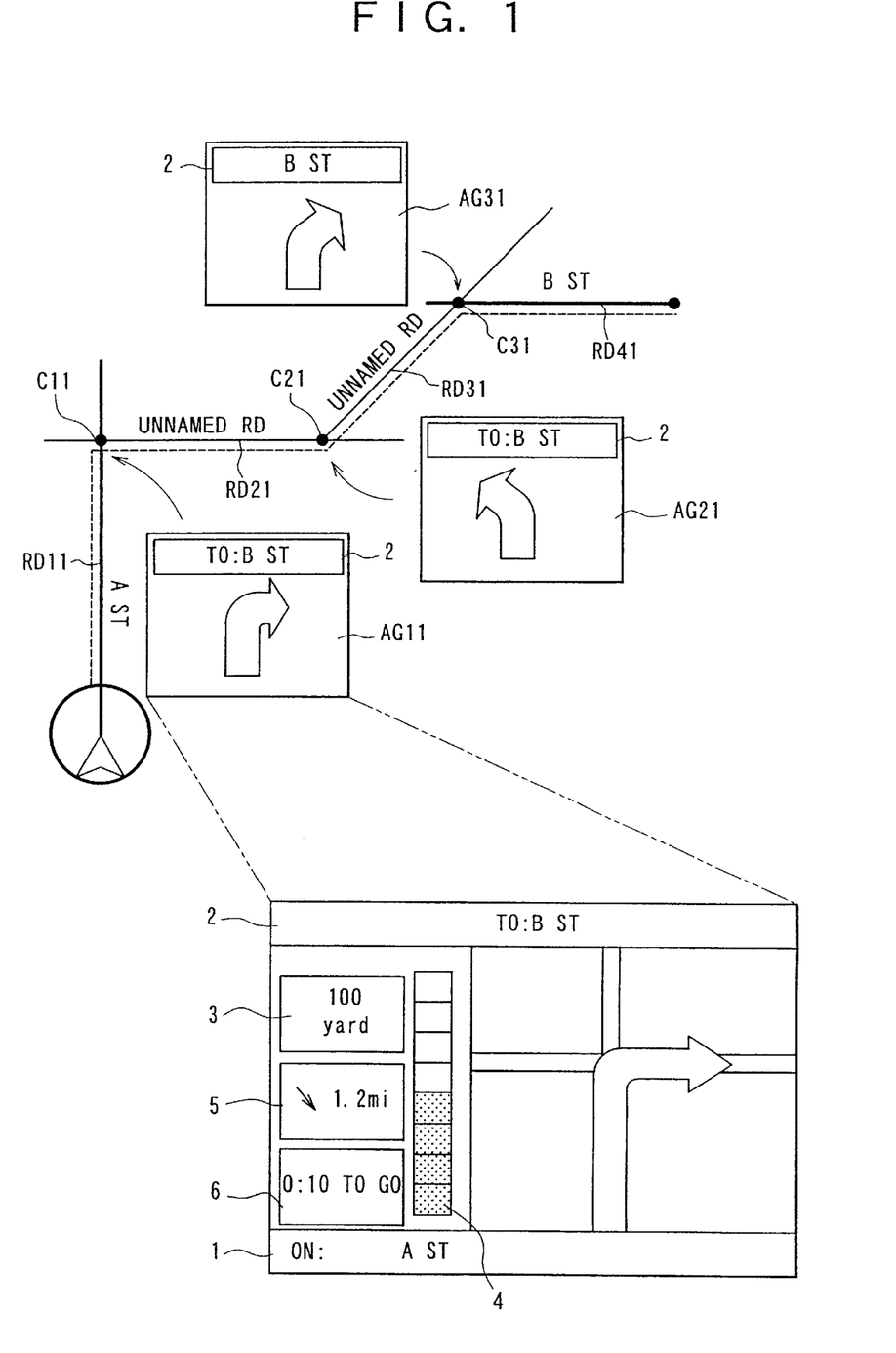
FIG. 1 is a schematic diagram illustrating a first preferred embodiment according to the present invention.

DESCRIPTION OF THE PREFERRED EMBODIMENTS (A) Outline of Present Invention (a) Outline of First Preferred Embodiment FIG. 1 is a schematic diagram illustrating the first preferred embodiment according to the present invention. Referring to FIG. 1, a dotted line designates a guidance route, and elements that are in common with FIG. 7 are given the same reference numbers. According to the first preferred embodiment, even though a next road to be traveled beyond the road on which a vehicle is traveling has not been named, the navigation device determines a first available road having a road name from the roads included in a guidance route past or beyond the next road, and displays the road name of the determined road.

Suppose the vehicle is traveling on a road RD11 (whose name is "A Street"), a next road RD 21 beyond a next intersection C11 is unnamed as shown in FIG. 1. In this case, the navigation device determines a first road RD41 having the road name (B ST) which is first available from the roads included in the guidance route past or beyond the road RD11, and displays on a display part 2 of an arrow-guidance-screen AG11 a message "TO B ST" indicating that the vehicle is traveling towards the road RD41.

Also, in a case where the vehicle is traveling on a road RD21, a next road RD31 beyond a next intersection C21 is unnamed as shown in FIG. 1. Then, the navigation device determines the first road RD41 having the road name (B ST) which is first available from the roads constituting the guidance route past the road RD21, and displays on the display part 2 of an arrow-guidance-screen AG21 the message "TO B ST" indicating that the vehicle is traveling towards the road RD41.

In contrast, if the vehicle is traveling on the road RD31, the next road RD41 beyond a next intersection C31 is named "B ST", and the navigation device displays a message "B ST" on the display part 2 of an arrow-guidance-screen AG31, in the same way as the conventional navigation device.

(b) Outline of Second Preferred Embodiment

Figure 2:
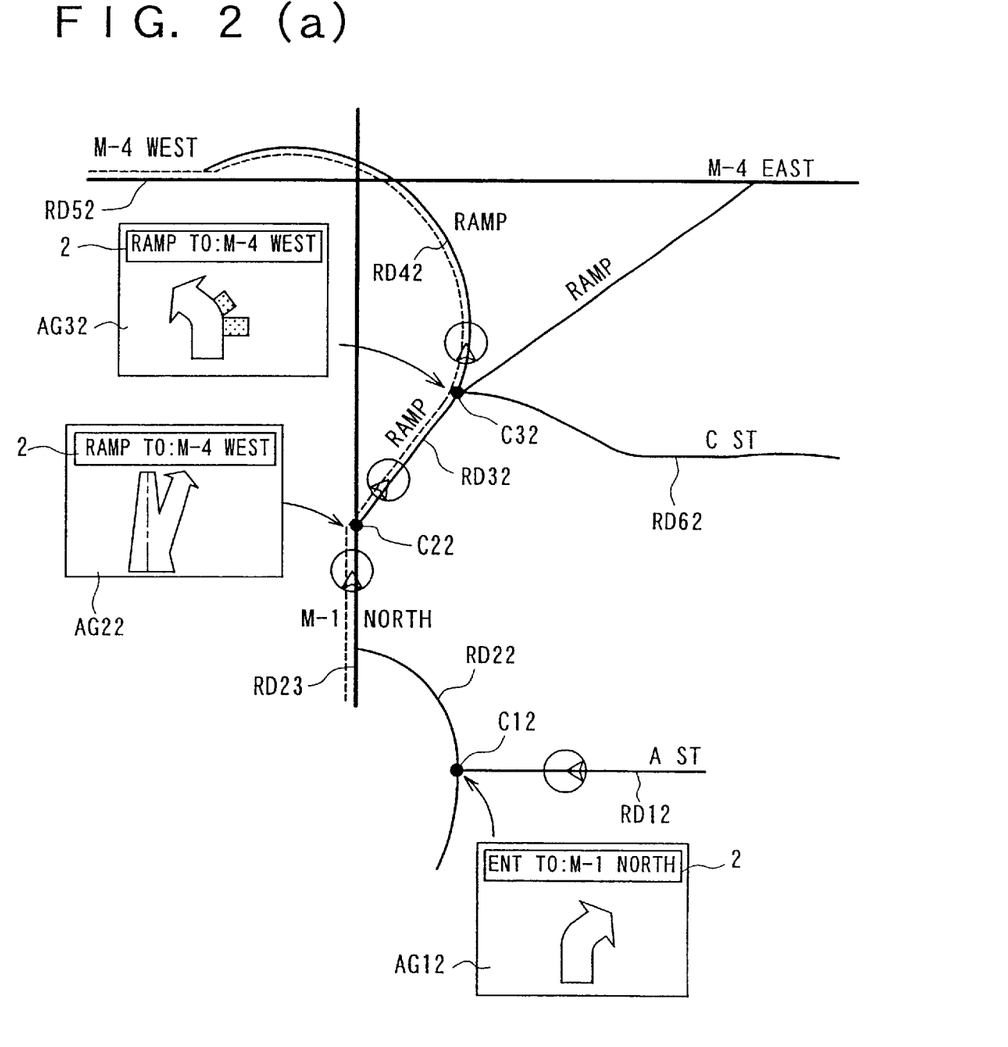
FIG. 2 is a schematic diagram illustrating a second preferred embodiment according to the present invention.

FIGS. 2(a) and (b) are schematic diagrams illustrating a second preferred embodiment according to the present invention. Referring to FIG. 2, a dotted line designates a guidance route, and elements that are in common with FIG. 8 are given the same reference numbers. In accordance with the second preferred embodiment, when a next road to be traveled or approached past the road on which a vehicle is traveling is a ramp, the navigation device determines a road past the ramp, which is connected to the ramp and which is included in the guidance route, and displays the name of the determined road.

Suppose the vehicle is traveling on A Street, which is a general road, a next road RD22 past a next intersection C12 is a ramp, and the intersection C12 is an entrance to a highway, as shown in FIG. 2(a). Then the navigation device determines the highway RD23 connected to the ramp and included in the guidance route, and displays on the display part 2 of an arrow-guidance-screen AG12 (see FIG. 2(a)) a message "ENT TO: M-1 NORTH" indicating that the vehicle is traveling to the highway RD23 via the entrance of the highway.

If the vehicle is traveling on the highway RD23, a next road RD32 beyond a next intersection C22 is a ramp, as shown in FIG. 2(a). Then the navigation device determines a highway RD52, which is connected to the ramp and which is included in the guidance route. The navigation device also displays on an approaching road name column, namely, on the display part 2 of an arrow-guidance-screen AG22 (see FIG. 2(a)) a message "RAMP TO: M-4 WEST" indicating that the vehicle is traveling to the highway RD52 via the ramp. Similarly, in a case where the vehicle is traveling to a general road RD62 via the ramp RD32 and an intersection C32 along the guidance route, the intersection C32 is an exit of the highway. Then, as shown in FIG. 2(b), the navigation device determines the general road RD62 (whose road name is "C ST") connected to the ramp RD32 and included in the guidance route, and displays on the display part of the arrow-guidance-screen AG22 a message "EXIT TO: C ST" indicating that the vehicle is traveling from the exit of the highway to the general road "C ST".

As shown in FIG. 2(a), after the vehicle travels on the road RD32, a next road RD 42 beyond the next intersection C32 is a ramp. In this case, the navigation device determines the highway RD52 connected to the ramp RD42 and included in the guidance route, and displays on the display part 2 of an arrow-guidance-screen AG32 (see FIG. 2(a)) the message "RAMP TO: M-4 WEST" indicating that the vehicle is traveling to the highway RD52 via the ramp.

(B) Construction of Navigation Device

Figure 3:
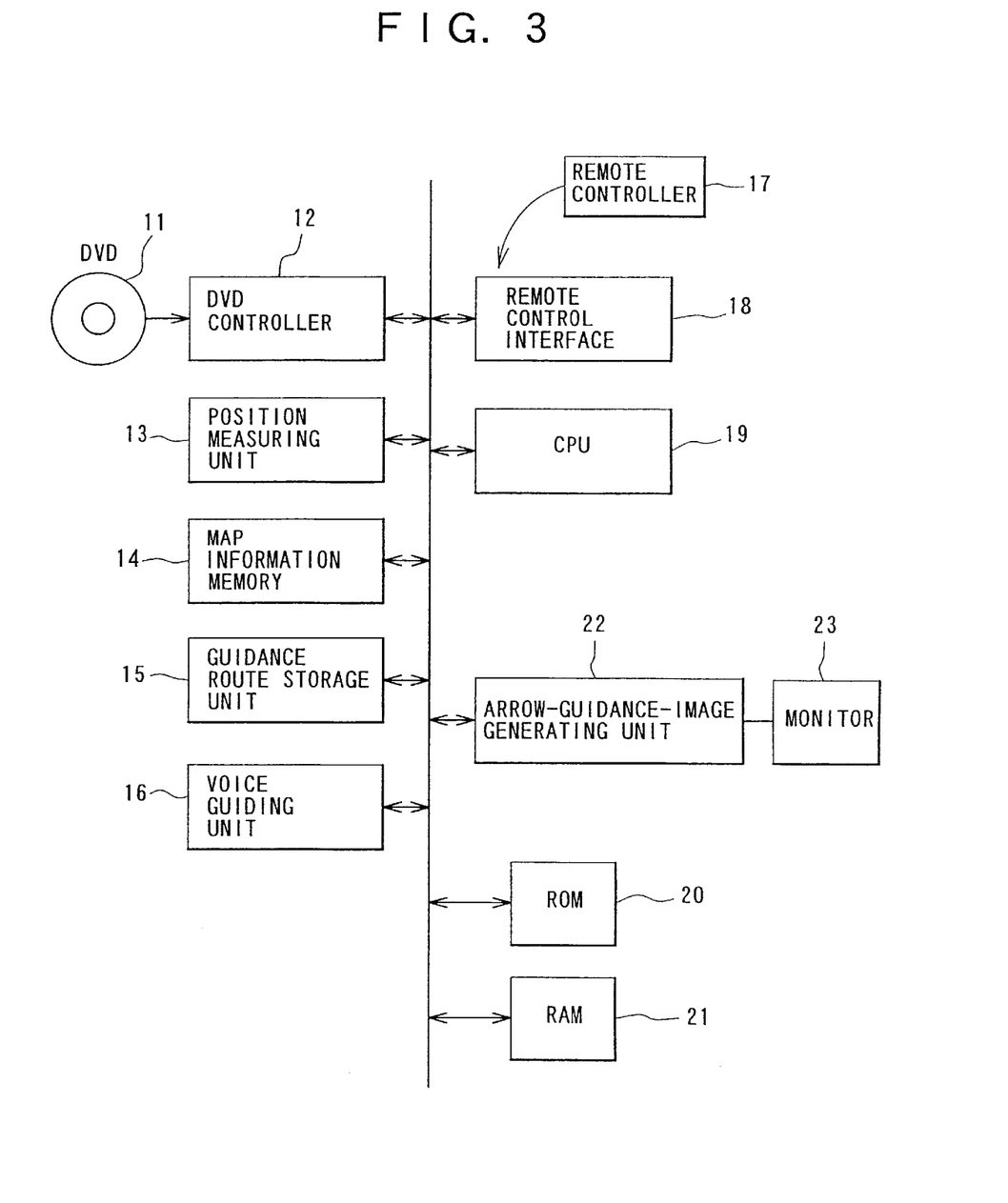
FIG. 3 is a diagram illustrating the construction of a navigation device according to the present invention.

FIG. 3 is a diagram illustrating the construction of the navigation device according to the present invention. The navigation device includes a DVD 11 serving as a map storage member for storing a map, a DVD controller 12 for reading out the predetermined map from the DVD 11, and a position measuring unit 13 for detecting a vehicle position. The position measuring unit 13 has a range sensor for generating a pulse every time the vehicle passes through a predetermined distance, an angle sensor for measuring the traveling direction of the vehicle, a global positioning system (GPS) receiving unit, and the like. Further, the navigation device includes a map information memory 14 for storing map information read from the DVD 11, a guidance route storage unit 15 for storing the searched guidance route information to the destination, a voice guiding unit 16 for guiding the recommended traveling direction at an intersection by voice, a remote controller 17 for entering inputs such as menu selection, map scrolling, search for a route to the destination, or the like, a remote control interface 18, a processor (CPU) 19 for controlling the overall operation of the navigation device in accordance with stored programs, a ROM 20 for storing a guidance route search program, an arrow-guidance control program, and the like, a RAM 21 for storing processed results, an arrow-guidance-image generating unit 22 for generating an arrow-guidance-image based on the map information and the guidance route data, and a monitor 23.

Figure 4:
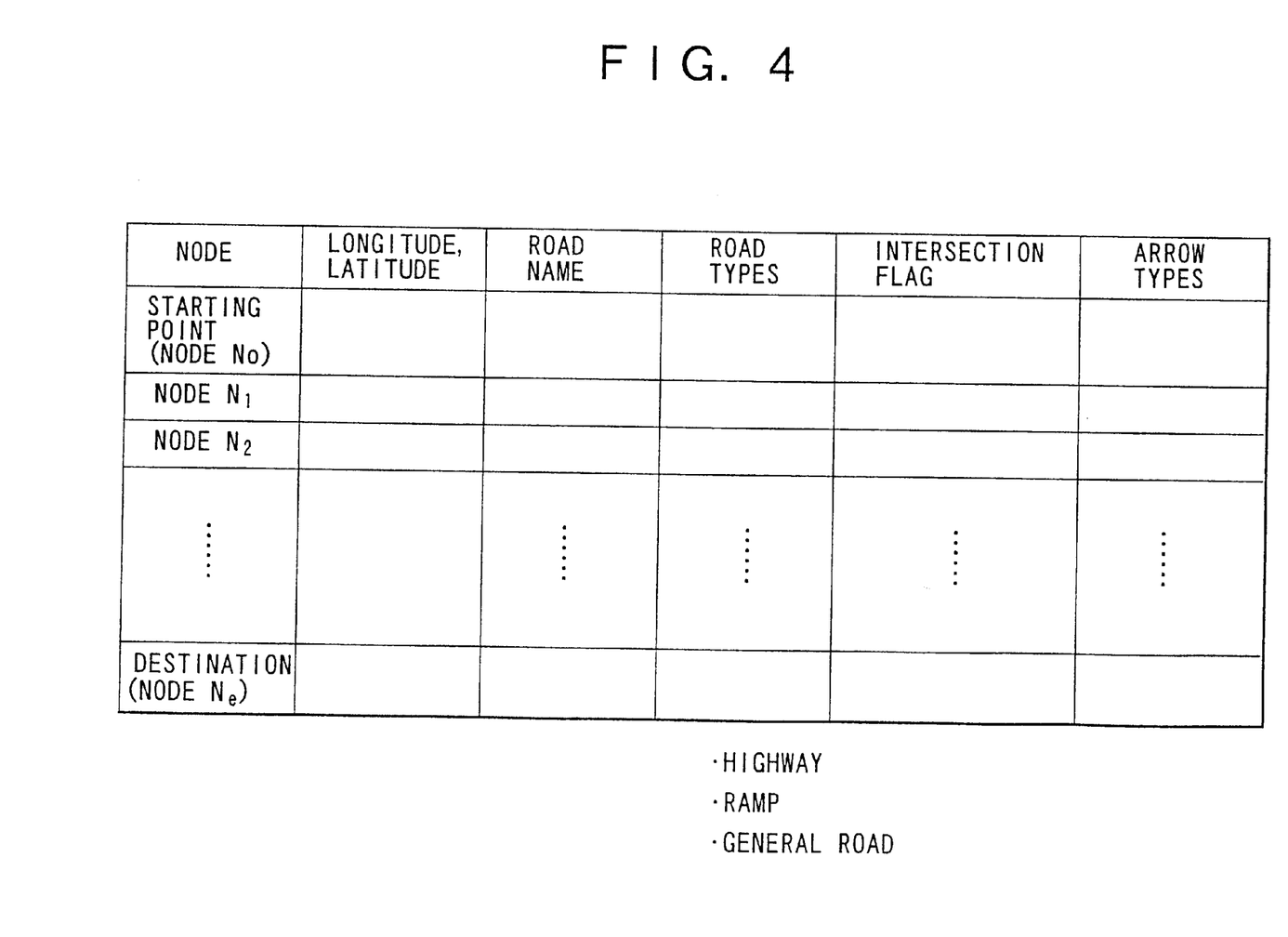
FIG. 4 is a diagram illustrating guidance route information according to the present invention.

FIG. 4 is a diagram of guidance route information obtained by guidance route search processing. The guidance route information is organized by the following categories: 1) position data (longitude, latitude) for all nodes "$N_0$" to "$N_e$" covering the guidance route from the starting point to the destination; 2) link name (road name) connecting the present node with the next node; 3) road types (highway, ramp, general road, and the like); 4) intersection flag indicating whether or not a location in question is an intersection; 5) arrow types that designate the turning directions of the vehicle at the intersections, and the like. It is, however, noted that an unnamed road is stored as "No Road Name" in the second category of the table of FIG. 4. Further, the road includes a street.

(C) Road Name Displaying Process of First Preferred Embodiment

Figure 5:
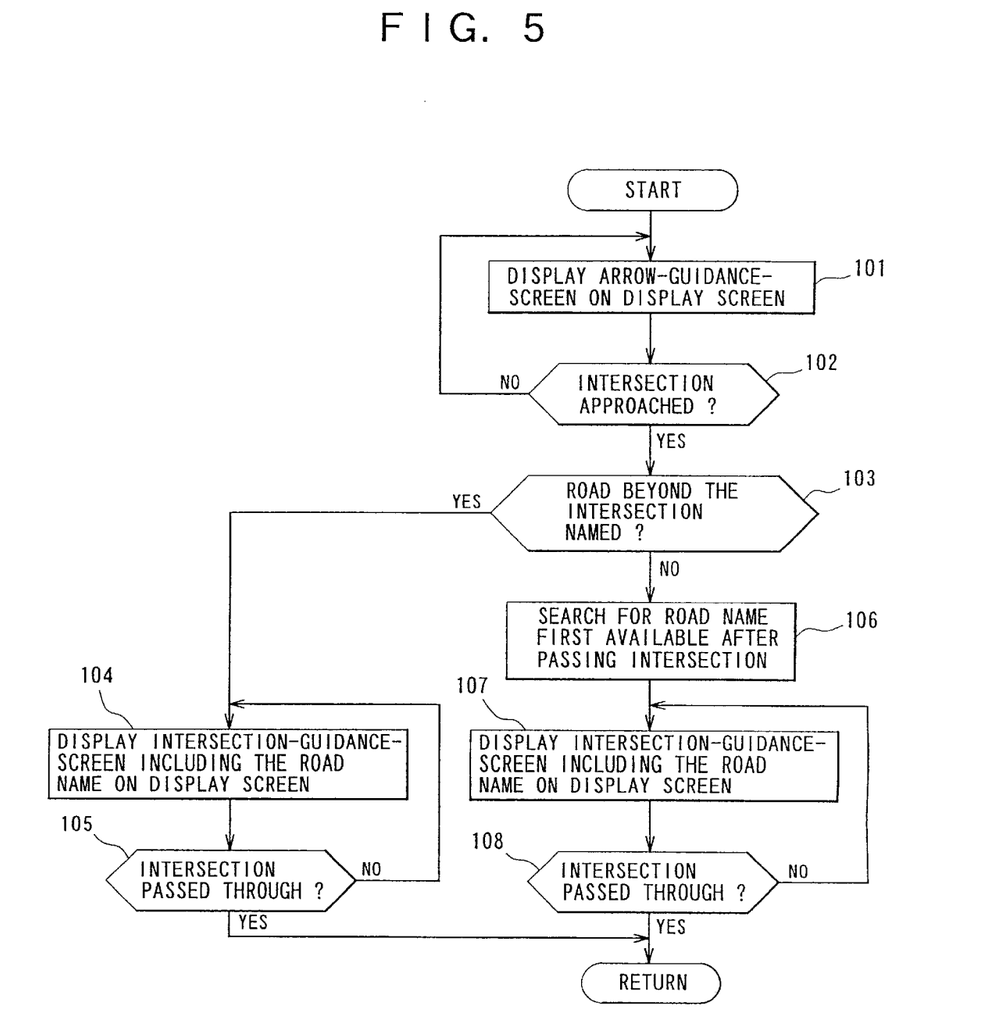
FIG. 5 is a flow chart of the process of displaying a road name according to the first preferred embodiment.

FIG. 5 is a flow chart of a road name displaying process according to the first preferred embodiment. Hereafter, it is assumed that the guidance road has already been searched for and stored in the guidance route storage unit 15.

First, an arrow-guidance-screen is displayed on the display screen or area that indicates the straight travel of the vehicle (step 101), and then it is checked whether the vehicle is approaching the next intersection or not, with reference to the guidance route information (step 102). While the vehicle is not approaching the next intersection, the above arrow-guidance-screen remains on the display screen or area.

When the vehicle comes close to the next intersection, it is checked whether the next road past the intersection is named or not (step 103). If yes, an intersection-guidance-screen (see the arrow-guidance-screen AG31 of FIG. 1) is displayed that indicates the road name as an approaching road name on the display part 2 (step 104). Then, it is checked whether the vehicle has passed through the intersection or not (step 105). If no, the process returns to step 104, and the display of the intersection-guidance-screen in step 104 is continued. If the vehicle passes through the intersection, that is, if yes, the process returns to the beginning and starts again from step 101.

In contrast, if the next road past the intersection is judged to be unnamed in step 103 and the road name of the next road is not available, a first available road having a road name which is from the roads included in the guidance route beyond the intersection is searched for (step 106).

When the first named road is determined, an intersection-guidance-screen is displayed that shows the road name of the first named road (step 107). Preferably, the intersection-guidance-screen shows a message indicating that the vehicle is traveling to the first named road, rather than only the name of the first road. (See, for example, on the display part 2 of the arrow-guidance screen AG11 or AG21 of FIG. 1, the message "TO: B ST".) After that, whether or not the vehicle has passed through the intersection is checked (step 108). If no, the process repeats from step 107, and the display of the intersection-guidance-screen is continued. If yes, the process returns to the beginning and starts again from step 101.

(D) Road Name Displaying Process of Second Preferred Embodiment

Figure 6:
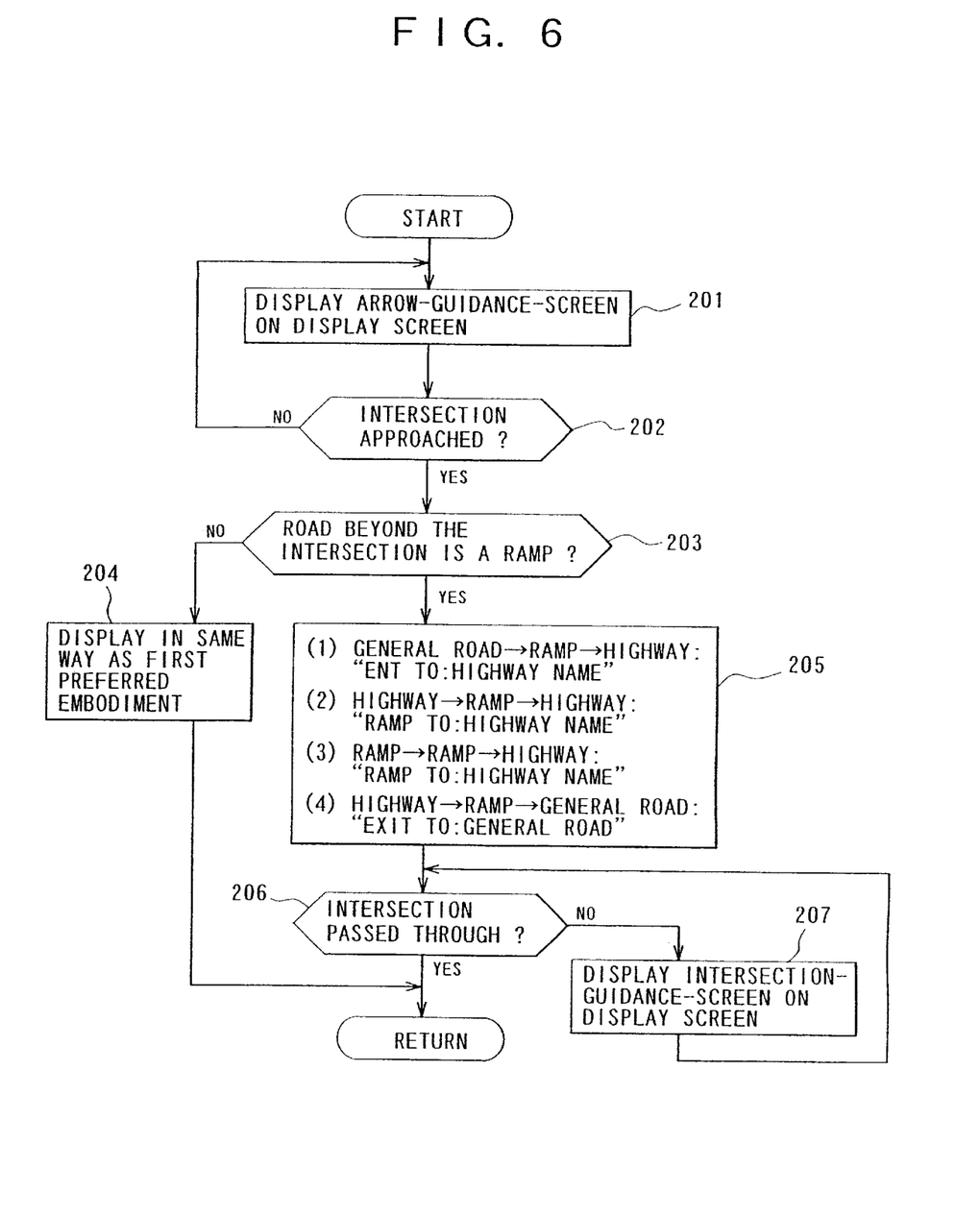
FIG. 6 is a flow chart of the process of displaying a road name according to the second preferred embodiment.

FIG. 6 is a flow chart of a road name displaying process according to the second preferred embodiment. Hereafter, it is assumed that the guidance road has already been searched for and stored in the guidance route storage unit 15.

First, an arrow-guidance-screen is displayed on the display screen that indicates the straight travel of the vehicle (step 201). Then, whether or not the vehicle is approaching the next intersection is checked with reference to the guidance route information (step 202). While the vehicle is not approaching the next intersection, the above arrow-guidance-screen remains on the display screen.

When the vehicle comes close to the next intersection, whether or not the road beyond the intersection is a ramp is checked (step 203). If no, the process returns to and advances from step 103 of the first preferred embodiment in FIG. 5 (step 204).

If the road beyond the intersection is a ramp in step 203, that is, if yes, it is checked and determined to which one of the following patterns (1) to (4) a present road pattern belongs, with reference to the guidance route information. Here, the present road pattern is composed of a combination of (a) a present traveling road type (the type of the road on the near side of the intersection),(b)the ramp(the type of the road beyond the intersection), and (c)the type of the road past the ramp.

| (a) | | (b) | | (c) |
|---|---|---|---|---|
| (1) general road | → | ramp | → | highway |
| (2) highway | → | ramp | → | highway |
| (3) ramp | → | ramp | → | highway |
| (4) highway | → | ramp | → | general road |

Then, an intersection-guidance-screen corresponding to the determined pattern is displayed (step 205).

For example, if the present road pattern belongs to the above pattern (1), the intersection is an entrance to a highway. The highway connected to the ramp is determined on the basis of the guidance route information, and a message "ENT TO: HIGHWAY NAME" is displayed on the arrow-guidance-screen that means the vehicle is traveling to the highway via the highway entrance (see the arrow-guidance-screen AG12 of FIG. 2(*a*)).

If the present road pattern belongs to the above pattern (2), a highway connected to and beyond the ramp is determined on the basis of the guidance route information. A message "RAMP TO: HIGHWAY NAME" is displayed on the arrow-guidance-screen that indicates the vehicle is traveling to the determined highway via the ramp (see the arrow-guidance-screen AG22 of FIG. 2(*a*)).

If the present road pattern belongs to the above pattern (3), a highway connected to the ramp is determined on the basis of the guidance route information. A message "RAMP TO: HIGHWAY NAME" is displayed on the arrow-guidance-screen that indicates the vehicle is traveling to the determined highway via the ramp (see the arrow-guidance-screen AG32 of FIG. 2(*a*)).

If the present road pattern belongs to the above pattern (4), the intersection is an exit of the highway. Then a general road connected to the ramp is determined on the basis of the guidance route information, and a message "EXIT TO: GENERAL ROAD NAME" is displayed on the arrow-guidance-screen that indicates the vehicle is traveling to the determined general road via the exit of the highway (see the arrow-guidance-screen AG22 of FIG. 2(*b*)).

It is then checked whether the vehicle has passed through the intersection or not (step 206). If yes, the process returns to the start. If no, the intersection-guidance-screen obtained in the step 205 remains on the display screen (step 207), and the process returns to step 206 to be repeated.

According to one aspect of the present invention, there is provided a navigation device operable to guide a vehicle in accordance with a searched guidance route and to display the road name of a next road to be traveled. The navigation device, in a case where the next road to be traveled is not named, determines a first available road having a road name from the roads included in the guidance route beyond the next road, and displays the road name of the determined road. This permits the normal and convenient display of the road name to the user, even though the next road to be traveled is unnamed. In particular, the navigation device displays a message indicating that the vehicle is traveling to the determined road. That makes the display of the road name more convenient to the user.

According to another aspect of the present invention, there is provided a navigation device operable to guide a vehicle in accordance with a searched guidance route and to display the road name of a next road to be traveled. The navigation device, in a case where the next road to be traveled is a ramp, determines a road past the ramp connected to the ramp and included in the guidance route, and displays the road name of the determined road. This permits the normal and convenient display of the road name to the user, even though the next road to be traveled is a ramp.

In addition, according to still another aspect of the present invention, the navigation device checks whether the present road pattern "(a) Present Traveling Road Type→(b) Ramp→(c) Type of Road Past the Ramp" belongs to any one of the following patterns:(1)general road→ramp→highway;(2)highway→ramp→highway;(3)ramp→ramp→highway; and (4)highway→ramp→general road. The navigation device is designed to change the contents of the display in accordance with the pattern to which the present road pattern belongs, thereby permitting the normal and convenient display of the road name to the user.

What is claimed is:

1. A method for displaying a road name in a navigation device operable to guide a vehicle in accordance with a searched guidance route and to display the name of a next road to be traveled, the method comprising:

checking whether or not the next road to be traveled is named;

determining a first available road having a road name from the roads included in the guidance route beyond said next road, if the next road to be traveled is not named; and displaying the road name of the determined road.

2. The method according to claim 1, wherein said determined road includes a street.

3. The method according to claim 1, wherein it is checked whether or not the next road is named based on map data stored in a storage means.

4. A method for displaying a road name in a navigation device operable to guide a vehicle in accordance with a searched guidance route and to display the name of a next road to be traveled, the method comprising:

checking whether or not the next road to be traveled is a ramp;

determining a road beyond the ramp which is connected to the ramp and which is included in the guidance route, if the next road to be traveled is a ramp; and displaying the road name of the determined road.

5. The method according to claim 4, wherein said determined road includes a street.

6. The method according to claim 4, wherein it is checked whether or not the road to be traveled is named based on map data stored in a storage means.

7. The method according to claim 4, wherein, in a case where said ramp connects a general road to a highway, a state in which the vehicle is traveling towards an entrance to the highway is displayed.

8. The method according to claim 4, wherein, in a case where said ramp connects a highway to a general road, a state in which the vehicle is traveling towards an exit of the highway to the general road is displayed.

9. The method according to claim 4, wherein, in a case where said ramp connects a highway to another highway, a state in which the vehicle is traveling towards said another highway via the ramp is displayed.

10. The method according to claim 4, wherein, in a case where said ramp connects another ramp, on which the vehicle is traveling, to a highway, a state in which the vehicle is traveling towards said highway via said ramp is displayed.

11. A navigation device operable to guide a vehicle in accordance with a searched guidance route and to display a name of a next road to be traveled, the navigation device comprising:

a storage unit for storing guidance route information;

determining means that, in a case where the next road to be traveled is not named, operates to determine a first available road having a road name from the roads included in the guidance route beyond the next road, with reference to said guidance route information; and a displaying unit for displaying the road name of said first available road.

12. A navigation device operable to guide a vehicle in accordance with a searched guidance route and to display a name of a next road to be traveled, the navigation device comprising:

a storage unit for storing guidance route information;

determining means that, in a case where the next road to be traveled is a ramp, operates to determine a road beyond the ramp connected to the ramp and included in the guidance route, with reference to said guidance route information; and a displaying unit for displaying the road name of said determined road.

* * * * *